United States Patent [19]

Lee et al.

[11] Patent Number: 5,738,491
[45] Date of Patent: Apr. 14, 1998

[54] CONDUCTION BLADE TIP

[75] Inventors: Ching-Pang Lee, Cincinnati; Brent A. Gregory, Loveland, both of Ohio; Ariel C. P. Jacala, Scotia, N.Y.

[73] Assignee: General Electric Company, Cincinnati, Ohio

[21] Appl. No.: 778,529

[22] Filed: Jan. 3, 1997

[51] Int. Cl.$^6$ ................................ F01D 25/14
[52] U.S. Cl. ................................ 415/177
[58] Field of Search ................... 415/115, 116, 415/177; 416/223 A

[56] References Cited

U.S. PATENT DOCUMENTS

| | | | |
|---|---|---|---|
| 4,390,320 | 6/1983 | Eiswerth | 416/97 R |
| 4,411,597 | 10/1983 | Koffel et al. | 416/92 |
| 5,348,446 | 9/1994 | Lee et al. | 416/241 R |
| 5,645,399 | 7/1997 | Angus | 415/177 |

Primary Examiner—John T. Kwon
Attorney, Agent, or Firm—Andrew C. Hess; Patrick R. Scanlon

[57] ABSTRACT

A turbine blade includes an airfoil having a root, tip cap, and laterally opposite pressure and suction sides extending between leading and trailing edges. A cooling circuit is disposed inside the airfoil and extends from the tip cap to the root for circulating a coolant. The airfoil also includes a pair of squealer tips extending radially upwardly from the tip cap along the pressure and suction sides which are spaced apart from the leading to trailing edges to define an upwardly open tip cavity. A thermal conductor is fixedly joined to the squealer tips and extends radially inwardly to the tip cap for conducting heat thereto for removal by the coolant. The conductor preferably surrounds the tip cavity inboard of the squealer tips and is coextensive therewith for being protected thereby.

13 Claims, 3 Drawing Sheets

5,738,491

CONDUCTION BLADE TIP

CROSS REFERENCE TO RELATED APPLICATION

The present invention is related to application Ser. No. 08/778,565 filed Jan. 3, 1997.

BACKGROUND OF THE INVENTION

The present invention relates generally to gas turbine engines, and, more specifically, to turbine blade cooling.

A gas turbine engine includes a compressor for pressurizing air which is channeled to a combustor wherein it is mixed with fuel and ignited for generating hot combustion gas. The combustion gas flows downstream through one or more turbine stages which extract energy therefrom for producing useful work.

The first stage turbine blades receive the hottest combustion gas from the combustor and are typically cooled for providing an effective useful life thereof. Each blade includes a dovetail which mounts the blade to the perimeter of a rotor disk, and an integral hollow airfoil extends radially upwardly from the dovetail. A coolant such as a portion of pressurized air bled from the compressor is channeled upwardly through the dovetail and inside the airfoil in a suitable cooling circuit for removing heat from the airfoil.

For high temperature applications, the airfoil typically includes film cooling holes distributed over the pressure and suction sides thereof for producing a thin film of cooling air which protects the airfoil from the hot combustion gas.

The airfoil includes a radially outer tip which is spaced closely adjacent to a stationary turbine shroud for minimizing leakage of the combustion gas over the blade tip for maximizing thermodynamic efficiency. However, the rotating airfoil and stationary shroud are subject to differential thermal expansion and contraction during operation which sometimes leads to rubbing of the blade tip against the shroud. Accordingly, the shroud is typically formed of a suitable material for minimizing damage to the blade tip during tip rubs.

In order to protect the integrity of the airfoil and the cooling circuit therein, the airfoil typically has a radially outwardly tip cap which closes the radially outer end of the airfoil. Extending radially upwardly from the tip cap are a pair of squealer tips which form integral portions of the airfoil and extend along both the pressure and suction sides of the airfoil between the leading and trailing edges thereof. The squealer tips are laterally spaced apart between the leading and trailing edges to define an upwardly facing open tip cavity.

The squealer tips therefore define small extensions of the pressure and suction sides of the airfoil for maintaining the aerodynamic contours thereof and provide sacrificial material which may be damaged during tip rubs with the shroud without significantly affecting aerodynamic performance of the airfoil or airfoil structural integrity.

Since the squealer tips extend upwardly above the tip cap and are not directly exposed to the coolant circulating within the airfoil, they operate at an elevated temperature due to the heat load received from the combustion gas which flows thereover. Thermal and tip rub damage to the squealer tips affect the useful life of the airfoil. For improving airfoil life, it is known to add film cooling holes near or through the tip cap for channeling the coolant more closely to the squealer tips. However, the combustion gas which flows over the airfoil and over the squealer tips during operation produces strong secondary flow which adversely affects the ability to cool the squealer tips notwithstanding the tip cooling holes provided therefor.

In an aircraft gas turbine engine, the blade coolant is a portion of bleed air from the compressor as described above. Gas turbines are also designed for land-bases applications and are sometimes used in combination with steam turbines in combined cycle power plants. In one configuration, overall efficiency of the combined cycle plant may be improved by circulating steam through the turbine blades for cooling thereof in a closed circuit. In this embodiment, the airfoils are imperforate and therefore no coolant is discharged from the airfoil over its exterior surfaces. This further complicates the ability to effectively cool the squealer tips since they can therefore be cooled solely by limited heat conduction radially inwardly through the tips and into the tip cap of the airfoil which is in turn cooled by convection by the coolant circulated within the airfoil.

SUMMARY OF THE INVENTION

A turbine blade includes an airfoil having a root, tip cap, and laterally opposite pressure and suction sides extending between leading and trailing edges. A cooling circuit is disposed inside the airfoil and extends from the tip cap to the root for circulating a coolant. The airfoil also includes a pair of squealer tips extending radially upwardly from the tip cap along the pressure and suction sides which are spaced apart from the leading to trailing edges to define an upwardly open tip cavity. A thermal conductor is fixedly joined to the squealer tips and extends radially inwardly to the tip cap for conducting heat thereto for removal by the coolant. The conductor preferably surrounds the tip cavity inboard of the squealer tips and is coextensive therewith for being protected thereby.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
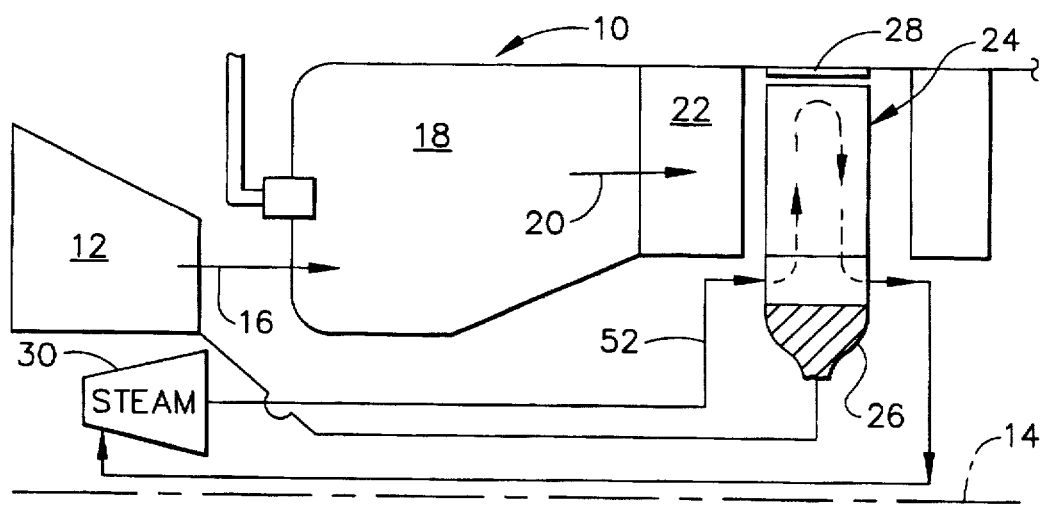
FIG. 1 is a schematic, axial sectional view of an exemplary axisymmetrical gas turbine engine in combined cycle with a steam turbine, and including turbine rotor blades in accordance with an exemplary embodiment of the present invention.

Illustrated schematically in FIG. 1 is a gas turbine engine 10 which may take any suitable form including a compressor 12 disposed coaxially about a longitudinal or axial centerline axis 14 which is effective for pressurizing ambient air to provide compressed air 16 to an annular combustor 18. The compressed air 16 is conventionally mixed with fuel in the combustor 18 and ignited for generating hot combustion gas 20 which flows downstream through one or more turbine stages.

In the exemplary embodiment illustrated in FIG. 1, a high pressure turbine includes a turbine nozzle 22 at the exit of the combustor 18 for channeling the combustion gas 20 through a plurality of circumferentially spaced apart turbine rotor blades 24 which extend radially outwardly from a rotor disk 26. The rotor disk 26 is fixedly joined to the compressor 12 by a suitable rotor shaft which is driven by energy extracted from the combustion gas 20 by the turbine blades 24.

Circumferentially surrounding the turbine blades 24 is a conventional annular turbine stator shroud 28 which defines with the blades 24 a relatively small gap or restriction for reducing leakage of the combustion gas 20 therebetween.

In the exemplary embodiment illustrated in FIG. 1, the engine 10 is land-based and is disposed in combination with a conventional steam turbine 30 in a combined cycle power plant. The turbine engine 10 and the steam turbine 30 may take any conventional form as desired.

Figure 2:
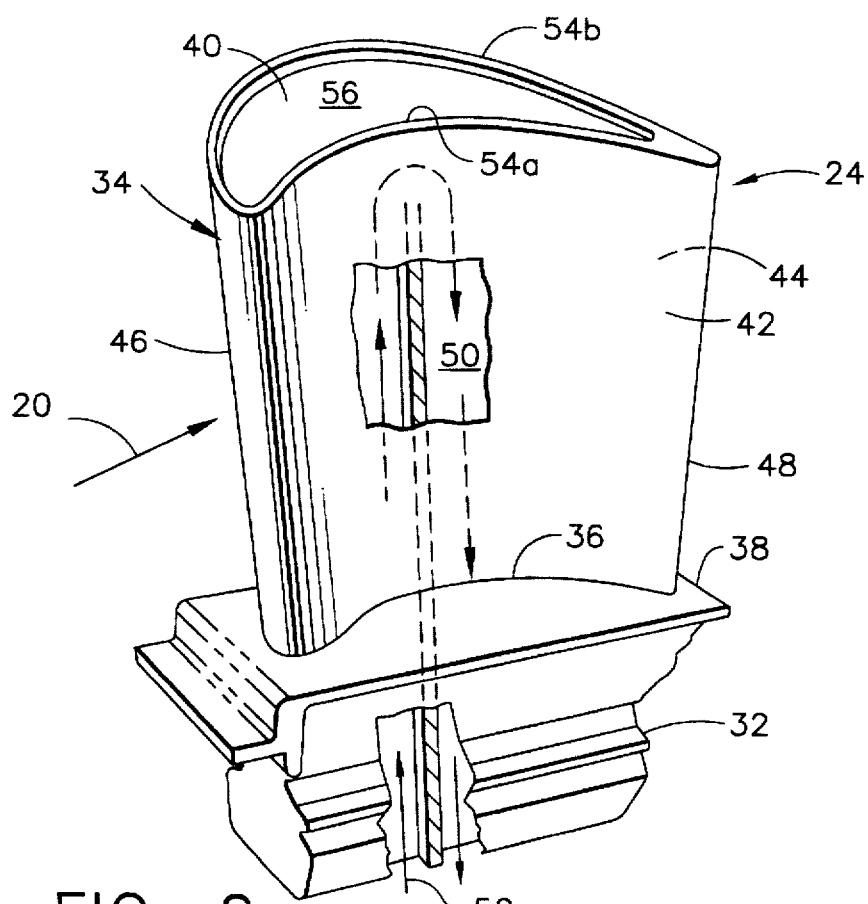
FIG. 2 is an isometric view of an exemplary one of the turbine blades illustrated in FIG. 1.

In accordance with the present invention, the turbine blades 24 are specifically configured for providing enhanced blade tip cooling. More specifically, FIG. 2 illustrates an exemplary one of the blades 24 which includes a conventional dovetail 32 suitably configured for mounting the blade 24 to the rotor disk 26 in a corresponding axial dovetail slot in the perimeter thereof.

The blade 24 further includes an airfoil 34 which may have any suitable configuration including a radially inner root 36 joined to the dovetail 32 at a platform 38 which defines a portion of the radially inner flowpath for the combustion gas 20. The blade tip region of the airfoil 34 includes a radially outer tip cap 40 which is radially opposite to the root 36. Laterally opposite pressure and suction sides 42, 44 extend chordally between a radially extending leading edge 46 and opposite trailing edge 48 from the root 36 to the tip cap 40. The aerodynamic contour of the airfoil 34 may have any conventional form, with the pressure side 42 typically being concave, and the suction side 44 being convex.

The airfoil 34 further includes a suitable internal cooling channel or circuit 50 which extends from the tip cap 40 to the root 36 and through the dovetail 32 for channeling or circulating a coolant 52 therethrough for cooling the blade 24 during operation.

In a typical gas turbine engine, the coolant 52 is a portion of the compressed air 16 suitably bled from the compressor 12 and circulated through the blade 24. Although the blade 24 may be configured for circulating bleed air therethrough, in the preferred embodiment of the present invention illustrated in FIGS. 1 and 2, the coolant 52 is steam suitably channeled from the steam turbine 30 and suitably returned thereto in a closed circuit.

In either embodiment of the invention wherein the coolant 52 is bleed air or steam, the tip region of the airfoil 34 enjoys improved cooling in accordance with the present invention. More specifically, the airfoil 34 illustrated in FIG. 2 further includes a pair of substantially identical squealer tips 54a,b extending radially upwardly from the tip cap 40 along respective ones of the pressure and suction sides 42, 44. The squealer tips 54a,b are spaced laterally apart from the leading to trailing edges 46, 48 at the tip cap 40 to define an upwardly open tip cavity 56.

The squealer tips 54a,b define integral extensions of the pressure and suction sides 42, 44 between the leading and trailing edges 46, 48 in a conventionally known manner. Squealer tips in general are conventionally known for defining a relatively small gap between the airfoil 34 and the turbine shroud 28 shown in FIG. 1 for minimizing leakage of a combustion gas 20 over the airfoil 34 for increasing thermodynamic efficiency of the engine 10. The squealer tips 54a,b allow the gap to be made relatively small so that occasional rubs between the squealer tips 54a,b and the turbine shroud 28 due to differential thermal expansion do not significantly damage the airfoil. In particular, the tip cap 40 itself is protected from tip rubs with the shroud 28 for maintaining the integrity of the airfoil 34 for effective aerodynamic performance thereof without compromising the internal cooling circuit 50 therein.

However, as indicated above, the squealer tips 54a,b are directly exposed to the hot combustion gas 20 and are therefore subject to significant heat loading therefrom which substantially increases their temperature relative to the airfoil 34 itself.

Figure 3:
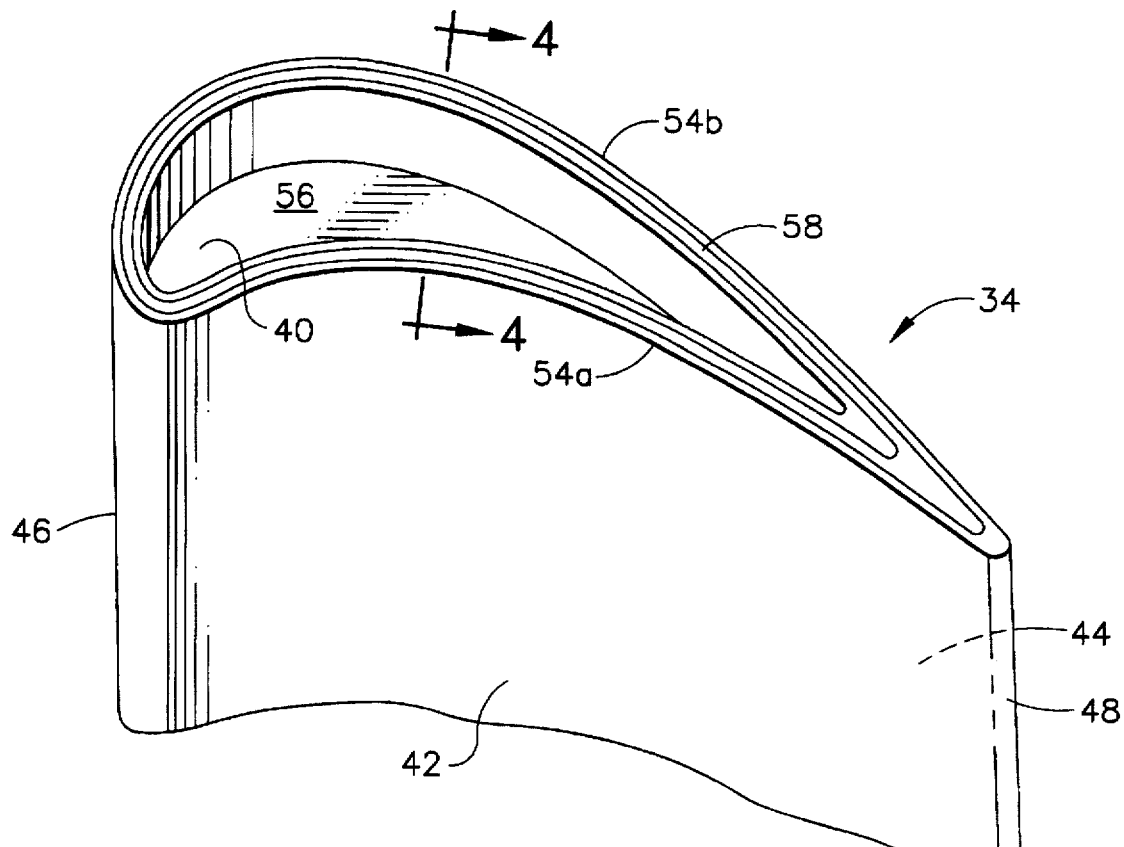
FIG. 3 is an enlarged isometric view of the tip region of the turbine blade illustrated in FIG. 2 showing a conduction cooled blade tip in accordance with an exemplary embodiment of the present invention.
Figure 4:
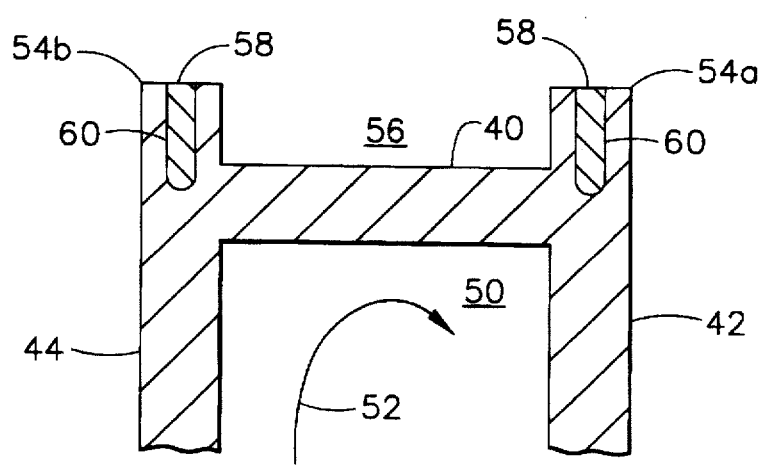
FIG. 4 is a radial sectional view through the blade tip illustrated in FIG. 3 and taken along line 4—4.

In accordance with the present invention and as illustrated in an exemplary embodiment in FIGS. 3 and 4, the squealer tips 54a,b are modified for improving the cooling thereof. More specifically, a thermal conductor 58 is fixedly joined to the squealer tips 54a,b and extends radially inwardly to contact the tip cap 40 for conducting heat thereto for removal by the coolant 52. The airfoil 34, except for the conductor 58 is typically formed as one-piece member of the same material. For high performance gas turbine engines, the blade 24 including the airfoil 34 is formed of a nickel-based superalloy in single crystal form. This material enjoys significant strength at the high temperatures of operation in a first stage turbine. Since the squealer tips 54a,b are isolated from the cooling circuit 50 by the tip cap 40, they are cooled primarily by thermal conduction through the squealer tips 54a,b themselves, with the thermal conduction path extending through the tip cap 40 surrounding the cooling circuit 50. The coolant 52 removes heat from the inner surface of the tip cap 40 by convection for thereby reducing temperature of the airfoil.

The thermal conductor 58 is formed of a different material than the squealer tips 54a,b and the remainder of the airfoil 34 and has a substantially greater thermal conductivity for increasing thermal conduction heat removal from the squealer tips 54a,b. Suitable high conductivity materials for the conductor 58 for use in a gas turbine engine include chromium, nickel-aluminide (NiAl), and NiAl—Cr which have substantially greater thermal conductivity than that of conventional nickel-based superalloys. For example, the airfoil 34 may be formed of a nickel-based superalloy having a thermal conductivity of about 13 BTU/Hr-Ft-°F. Nickel aluminide, for example, has a substantially greater thermal conductivity of about 40 BTU/Hr-Ft-°F.

Although the thermal conductor 58 has greater thermal conductivity than the parent material of the airfoil 34 and squealer tips 54a,b, high conductivity materials are substantially brittle, and have a substantially lower ductility than that of the parent material such as the nickel-based super alloy. They are therefore subject to accelerated damage during operation in a gas turbine engine especially in the event of tip rubs with the shroud 28.

In accordance with another feature of the present invention, it is desirable to protect the thermal conductor 58 from structural damage by using the parent material in the region of the tip cap 40 and squealer tips 54a,b.

More specifically, and referring again to FIGS. 3 and 4, the conductor 58 preferably laterally bounds or surrounds the tip cavity 56 inboard of the squealer tips 54a,b, and the squealer tips 54a,b corresponding laterally surround the conductor 58. The conductor 58 and the squealer tips 54a,b are radially outwardly coextensive or extend the same radial height as illustrated in FIG. 4 for simultaneously rubbing against the surrounding turbine shroud 28 illustrated in FIG. 1. In this way, the squealer tips 54a,b formed of the parent material protect the brittle thermal conductor 58 while still maintaining the desired aerodynamic profile of the pressure and suction sides 42, 44.

In the specific embodiment illustrated in FIG. 4, the squealer tips 54a,b include a radially inwardly extending channel 60 which laterally surrounds the entire tip cavity 56 as illustrated in FIG. 3 along both the pressure and suction sides 42, 44 between the leading and trailing edges 46, 48. The channel 60 is preferably continuous around the perimeter of the tip cap 40, and the conductor 58 completely fills the channel 60.

The channel 60 may be suitably formed in the squealer tips by being integrally cast therewith. Or, the channel 60 may be formed in initially full thickness squealer tips 54a,b using conventional material removal processes such as electrical discharge machining (EDM). The conductor 58 may then fill the channel 60 in any suitable manner such as by plasma deposition, or by electron beam melting the material into the channel 60.

As shown in FIG. 4, the channel 60 and conductor 58 therein extend radially inwardly from the top of the blade into both the pressure and suction sides 42, 44 to at least the level of the tip cap 40 and slightly therein as shown for thermally conducting heat from the squealer tips 54a,b into the tip cap 40 from which heat is removed by convection in the coolant 52. The channel 60 is preferably substantially laterally centered in each of the squealer tips 54a,b for providing an equal amount of parent material both inboard and outboard of the conductor 58. In this way, the squealer tips 54a,b maintain their structural integrity and coextensiveness with the remainder of the airfoil for enhanced aerodynamic performance, as well as providing a suitable receptacle for receiving the thermal conductor 58 and enhancing thermal conduction from the squealer tips 54a,b into the tip cap 40.

In the preferred embodiment illustrated in FIGS. 3 and 4, the airfoil 34 is preferably imperforate for containing the coolant 52 therein and preventing any leakage thereof. In this way, the airfoil 34 is configured for operation in the combined cycle embodiment illustrated in FIG. 1 with the steam coolant 52 being suitably circulated through the airfoil in a closed circuit. The airfoil 34 is therefore cooled solely by the steam coolant 52 circulating in the cooling circuit 50 within the airfoil, without any film cooling or other holes discharging the coolant to the exterior of the airfoil 34.

Accordingly, cooling of the squealer tips 54a,b themselves is provided solely by thermal conduction into the tip cap 40 and then convection using the coolant 52. The high conductivity and low ductility thermal conductor 58 is protected inside the channel 60 and reduces damage or cracking thereof when the blade tip rubs against the turbine shroud 28.

Figure 5:
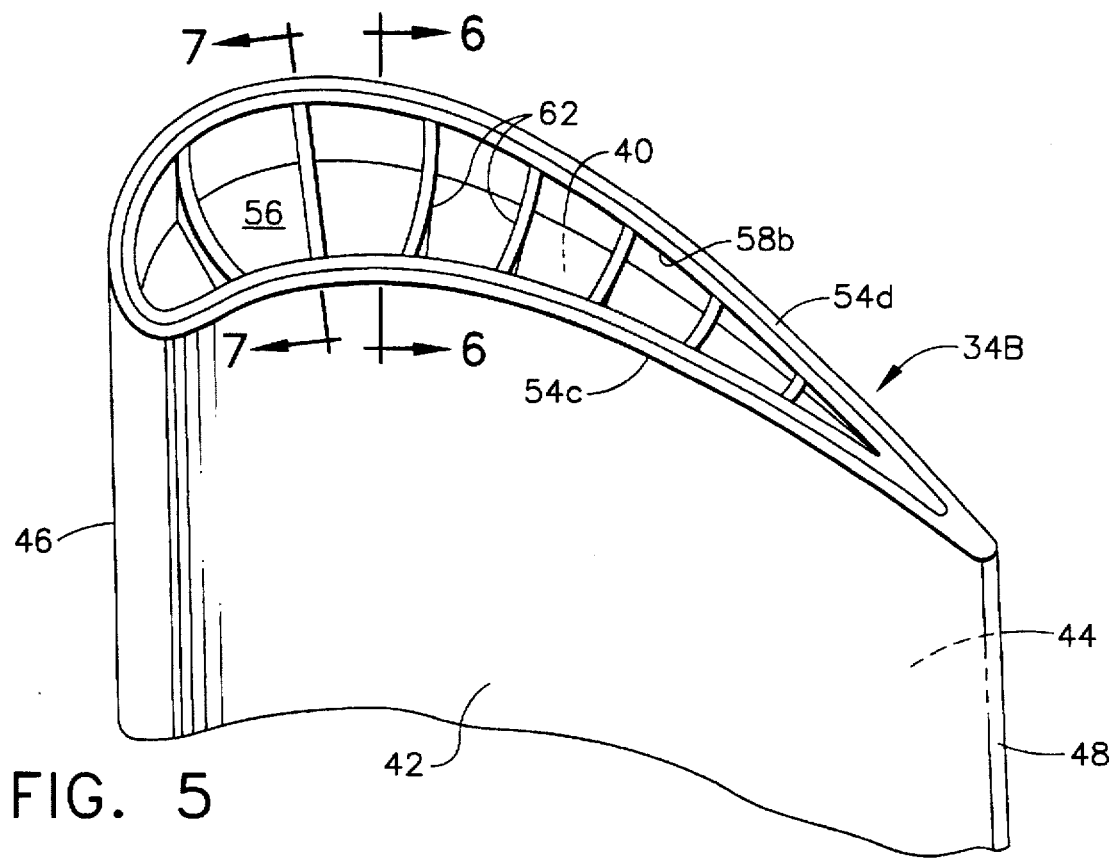
FIG. 5 is an enlarged isometric view of the tip region of the blade illustrated in FIG. 2 in accordance with a second embodiment of the present invention.
Figure 6:
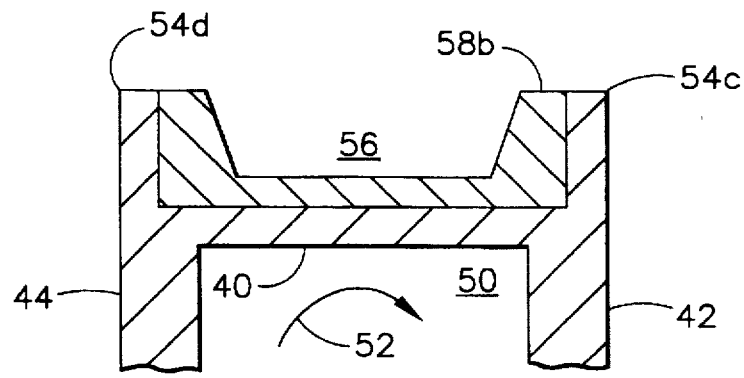
FIG. 6 is a radial sectional view through the blade tip illustrated in FIG. 5 and taken along line 6—6.
Figure 7:
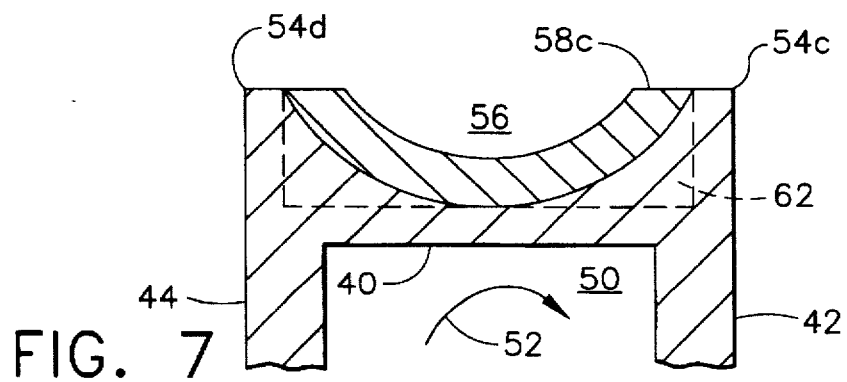
FIG. 7 is a radial sectional view through the blade tip illustrated in FIG. 5 and taken along line 7—7.

FIGS. 5–7 illustrate an alternate embodiment of the improved blade tip. The turbine blade 24 may be otherwise identical to the first embodiment illustrated in FIGS. 1–4 except for the alternate embodiment of the blade tips in the airfoil designated 34B. The same reference numerals have been used for like components between the two embodiments illustrated in FIGS. 3 and 5. In FIGS. 5 and 6, the conductor has an alternate form designated 58b, and includes an outboard surface fixedly joined to and covered by the inboard surfaces of the squealer tips, designated 54c, 54d. The pressure and suction side squealer tips 54c,d illustrated in FIG. 6 do not include the discrete channels 60 of the first embodiment for allowing the inboard surface of the conductor 58b to be directly exposed in the tip cavity 56. The inboard surface of the conductor 58b therefore defines the exposed portion of the tip cavity 56 bounded by the squealer tips 54c,d.

Also in the embodiment illustrated in FIG. 6, the conductor 58b extends between the squealer tips 54c,d and atop the tip cap 40 therebetween for conducting heat into the tip cap. In this way, the conductor 58b forms the upwardly open tip cavity 56 laterally between the squealer tips 54c,d, with the entire conductor 58b providing substantially increased area coextensive with the tip cap 40 for conducting heat thereto, and in particular to the center portion of the tip cap 40 for maximizing heat removal from the squealer tips.

The conductor 58b as illustrated in FIG. 6 preferably has tapered inboard sidewalls and/or rounded inboard corners for further enlarging the conduction area between the squealer tips and the center of the tip cap 40. Since the pressure and suction sides 42, 44 of the airfoil are heated by the combustion gas, more effective cooling of the squealer tips may be obtained by conducting heat toward the protected center of the airfoil inboard of the pressure and suction sides as provided at the tip cap 40.

In the preferred embodiment illustrated in FIGS. 5–7, the airfoil 34B is again imperforate for use in the combined cycle configuration illustrated in FIG. 1 with closed circuit steam cooling thereof. However, any of the embodiments of the present invention may also be used in an air cooled turbine blade having various film cooling holes extending therethrough, with the thermal conductor in the squealer tips nevertheless providing enhanced thermal conduction cooling thereof.

In order to further enhance the conduction cooling of the squealer tips 54c,d illustrated in FIG. 5, a plurality of chordally spaced apart ribs 62 extend laterally between the squealer tips 54c,d as illustrated in more particularity in FIG. 7. A suitable number of the ribs 62 are provided between the leading and trailing edges 46, 48 of the airfoil as desired for providing additional heat conduction members to the center portion of the tip cap 40.

As shown in FIG. 7, each rib 62 extends between the opposite squealer tips and atop the tip cap 40 itself and is suitably bonded thereto for conducting heat from the squealer tips into the center portion of the tip cap 40. The entire ribs 62 may be formed of the same material as the conductor 58b, but in the preferred embodiment illustrated, the conductor may be configured in a different form designated 58c disposed atop the individual ribs 62 formed of the airfoil parent material. In this way, improved strength and thermal conductivity may be obtained by the combination of the conductor 58c atop the corresponding ribs 62.

Since the ribs 62 and conductor 58c thereon are provided solely for enhancing thermal conduction from the squealer tips 54c,d, they are preferably configured for maximizing thermal conductivity without substantially increasing overall weight. In the exemplary embodiment illustrated in FIG. 7, the ribs 62 and conductor 58c thereon are arcuate radially inwardly or concave toward the center portion of the tip cap 40. In this way, the ribs 62 and conductor 58c converge from respective ones of the squealer tips 54c,d toward the center of the tip cap 40 for maximizing thermal conduction heat transfer thereto, without substantially increasing the thermal mass of the blade tip subject to heating by the combustion gas.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A turbine blade comprising:

a dovetail for mounting said blade to a rotor disk;

an airfoil having a root joined to said dovetail, a radially opposite tip cap, and laterally opposite pressure and suction sides extending between a leading edge and an opposite trailing edge;

said airfoil further including an internal cooling circuit extending from said tip cap to said root and through said dovetail for circulating a coolant therethrough for cooling said blade;

said airfoil additionally including a pair of squealer tips extending radially upwardly from said tip cap along respective ones of said pressure and suction sides, and spaced apart from said leading to trailing edges to define an upwardly open tip cavity; and a thermal conductor fixedly joined to said squealer tips and extending radially inwardly to said tip cap for conducting heat thereto for removal by said coolant, with said conductor having a greater thermal conductivity than said squealer tips.

2. A blade according to claim 1 wherein said conductor surrounds said tip cavity inboard of said squealer tips, and said squealer tips correspondingly surround said conductor.

3. A blade according to claim 2 wherein said conductor and squealer tips are radially outwardly coextensive for simultaneously rubbing against a surrounding shroud.

4. A blade according to claim 3 wherein said squealer tips include a radially inwardly extending channel surrounding said tip cavity, and said conductor fills said channel.

5. A blade according to claim 4 wherein said channel and conductor extend radially inwardly into both said pressure and suction sides to said tip cap for thermally conducting heat from said squealer tips into said tip cap.

6. A blade according to claim 5 wherein said channel is substantially centered in each of said squealer tips.

7. A blade according to claim 6 wherein said airfoil is imperforate for containing said coolant therein.

8. A blade according to claim 3 wherein said conductor includes an outboard surface covered by said squealer tips, and an inboard surface exposed in said tip cavity.

9. A blade according to claim 8 wherein said conductor extends between said squealer tips and atop said tip cap therebetween for conducting heat into said tip cap.

10. A blade according to claim 9 wherein said airfoil is imperforate for containing said coolant therein.

11. A blade according to claim 3 further comprising a plurality of spaced apart ribs extending laterally between said squealer tips and atop said tip cap for conducting heat from said squealer tips into a center portion of said tip cap.

12. A blade according to claim 11 wherein said conductor is further disposed atop said ribs.

13. A blade according to claim 12 wherein said ribs and conductor thereon are concave towards said tip cap center portion.

* * * * *